Oct. 3, 1961

J. A. GREEFKES 3,003,036

SINGLE SIDEBAND COMMUNICATION SYSTEM

Filed Sept. 25, 1959

INVENTOR
Johannes anton greefkes
BY
Frank R. Jeffress (signature)
AGENT 3,003,036

SINGLE SIDEBAND COMMUNICATION SYSTEM

Johannes Anton Greefkes, Eindhoven, Netherlands, assignor to North American Philips Company, Inc., New York, N.Y., a corporation of Delaware Filed Sept. 25, 1959, Ser. No. 842,352
Claims priority, application Netherlands Sept. 30, 1958
5 Claims. (Cl. 179—15.5)

Figure 1:
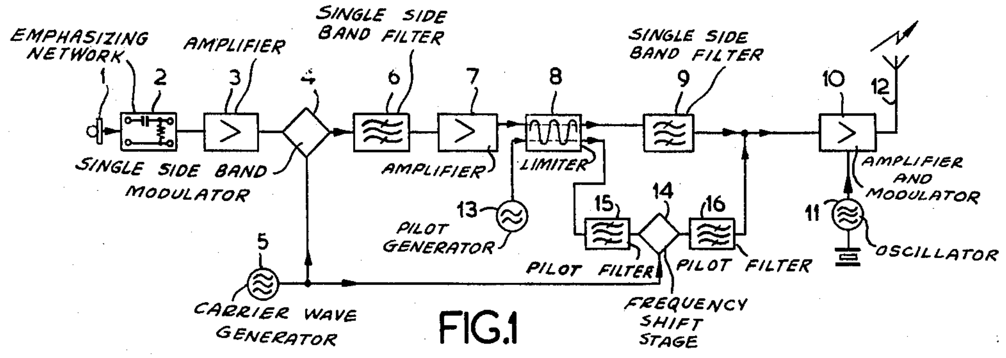

The present invention relates to transmission systems for speech transmission comprising a single-side band generator which is controlled by the transmitted speech signals, and a limiter which is connected to the output of the single-side band generator and serves for limiting the single-side band speech signals to a substantially constant amplitude, while a local pilot generator is connected to the input of the limiter for producing a pilot voltage varying with the instantaneous intensity of the speech signals, and the transmitted speech frequency band is flanked in frequency by the transmitted pilot voltage. A system of this type is disclosed in U.S. Patent No. 2,907,831.

In single-side band apparatus of the aforesaid type, the pilot signal is, for example, the carrier frequency and, at the receiver end, the transmitted single-side band speech signal is supplied to a single-side band demodulator through a limiter, while the pilot voltage, after amplitude detection in a pilot channel, controls a modulator located between the limiter and the single-side band demodulator. In this manner, both excellent intelligibility of the voice signals and a particularly high transmission efficiency have been obtained, since now the transmitter can be fully driven normally by the limited single-side band signal and satisfactory voice reception is feasible even at very low signal-to-noise ratios at the receiver input, for example less than 10 db.

The present invention has for its object to provide, in a transmitter of the aforesaid type, an improvement in voice quality, which improvement extends to the exceedingly low signal-to-noise ratio at the receiver input and consequently improves the intelligibility with this exceedingly low signal-to-noise ratio of, say, approximately 3 db.

According to the invention, the pilot frequency produced by the local pilot generator is located at a distance corresponding to the voice frequency band from the single-side band voice signal supplied to the limiter, and the transmission system also comprises a frequency shift-stage which, as a result of frequency shift, urges the pilot voltage, which is derived from the output of the limiter, and the voice frequency band to an adjoining frequency position.

In a suitable form of the device according to the invention, an accurate location of the frequency of the transmitted pilot signal relative to the voice frequency band is secured with the use of a simple pilot generator by employing for the latter an audio-frequency oscillator delivering a frequency above the highest voice frequency, while the pilot signal derived from the limiter output is placed adjacent the limited single-side band voice signal by the local oscillator in the frequency-shift stage which local oscillator is connected to the single-side band generator, and is transmitted jointly with the limited single-side band voice signal taken from the limiter output.

In a second advantageous form, which may be advantageously used as an auxiliary apparatus in a normal single-side band transmitter, the pilot generator delivers a pilot signal of a frequency which is located on the side of the side band suppressed in the single-side band generator at a frequency distance from the carrier frequency, which exceeds the highest voice frequency, and, in order to bring the voice frequency band and the pilot signal into adjoining frequency ranges, the limited single-side band voice signal taken from the output circuit of the limiter together with the pilot signal is supplied to the frequency-shift stage, to which is also applied the output voltage of the local oscillator connected to the single-side band generator.

Figure 2:
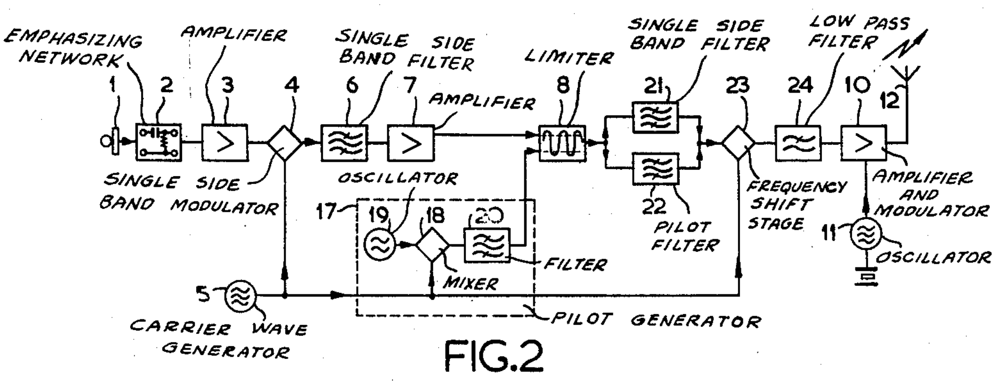

In order thaa tthe invention may be readily carried into effect, examples will now be described in detail with reference to the accompanying drawing, in which FIG. 1 is a block diagram of one embodiment of a transmission system according to the invention and FIG. 2 is a block diagram of another embodiment of the invention which may be advantageously used as an auxiliary apparatus in a normal single-side band transmitter.

In the block-diagram shown in FIG. 1, the reference numeral 1 designates a microphone, from which the voice signals to be transmitted and comprised in the frequency band of from 0.3 to 3.4 kc./s. are derived. In view of limitation of the single-side band voice signals to be performed in the transmitter, thus de-emphasizing the generally weaker high frequencies of the voice signal, the voice signals derived from the microphone 1 are passed through an emphasizing network 2. This network emphasizes voice frequencies above, say, 600 c./s. to 800 c./s. and particularly emphasizes higher voice frequencies by, say, 6 db per octave. Through an amplifier 3 the voice signals are supplied to a single-side band modulator 4, to which is also applied a carrier frequency of, say, 60 kc./s. from a carrier-wave generator 5, while the output circuit of the single-side band modulator 4 comprises a single-side band filter 6 which suppresses the lower side band resulting from modulation and the carrier frequency but passes the upper side band of 60.3 kc./s. to 63.4 kc./s.

The single-side band signal derived from the single-side band filter 6 is amplified in an amplification stage 7 and subsequently supplied to a limiter 8 for limiting the single-side band voice signal to a substantially constant amplitude, the single-side band voice signal of substantially constant amplitude thus obtained being transmitted by the transmission antenna 12 through a second single-side band filter 9 after amplification in an amplifier 10 and frequency transposition by means of a crystal-controlled oscillator 11 to the desired transmission frequency band of $f+0.3$–$f+3.4$ kc./s. The second single-side band filter 9 has for its purpose to suppress any distortion products resulting from limitation in the limiter 8 beyond the frequency band.

Jointly with the single-side band voice signal there is also supplied to the limiter 8 a pilot signal from a pilot generator 13, the level of which pilot signal exceeds the limitation level and is lower than the normal single-side band voice level (say —20 db to —30 db). As set out in U.S. Patent No. 2,907,831, a pilot signal varying in respect of amplitude oppositely to the instantaneous intensity of the voice signal is thus produced at the output circuit of the limiter 8. In the stage 10, the pilot signal is likewise frequency-transposed and transmitted, together with the single-side band voice signal of $f+0.3$–$f$—3.4 kc./s., by the transmission antenna 12 in a frequency position flanking the single-side band voice signal with, say, a frequency of $f+3.7$ kc./s.

According to the invention the transmission quality is appreciably improved, since the pilot frequency produced by the local pilot generator 13 is placed at least at a frequency-distance corresponding to the voice frequency band of the single-side band voice signal supplied to the limiter 8, while the transmission system also comprises a frequency-shift stage 14 which, by frequency-shift, urges the pilot voltage derived from the output of the limiter 8 and the voice frequency band to an adjoining frequency position. For this purpose, in the present example, the pilot signal, which is at a frequency distance of at least 3.1 kc./s. from the single-side band voice signal, is supplied through a pilot filter 15 to the frequency-shift stage 14, the output circuit of which is connected to the input of the amplifier 10 through a second pilot filter 16.

As a matter of fact, limitation of the single-side band voice signal together with the pilot signal in the limiter 8 results in introducing distortion products into the frequency band of the single-side band voice signal, which products differently affect the speech quality dependent upon their nature. It has in particular been found that the influencing of the speech quality is substantially due to intermodulation products between the pilot signal and the voice components, this, for example, in contra-distinction to intermodulation products between the relative voice components which, although usually having a higher level, affect the speech quality to a far lower degree.

The set frequency distance of at least the voice frequency band between the pilot signal and the single-side band voice signal results in the distortion products of the first type lying to a far lesser degree within the frequency band of the single-side band voice signal, so that a considerable improvement of the voice quality is obtained which is found to extend even to the lowest signal-to-noise ratios.

It has also been found that for obtaining the greatest improvement in the quality of transmission, the frequency of the pilot signal should be selected so that low order multiples or fractions thereof do not lie either within or close to the frequency range of the single side-band voice signal. In other words, in the above example, the frequency of the pilot signal should not be within the immediate proximity of 20 kc./s., 30 kc./s. 120 kc./s. or 180 kc./s. In the case of multiples or fractions of higher order, e.g. 4 or 5, it is not necessary that this latter condition be fulfilled.

The use of the single-side band transmitter so far described yielded in the associated receiver a considerable improvement of the reproduction quality which, as stated before, extends to the lowest signal-to-noise ratio. As a matter of fact, extensive comparison measurements had the remarkable result that a signal-to-noise ratio of 0 db at the receiver input yielded a reproduction quality corresponding to the quality of a receiver in a normal single-side band connection with a signal-to-noise ratio of 10 db, which constitutes a practical limit for normal single-side band connections. Thus the use of the invention permits a practicable single-side band connection to be secured even at exceedingly low signal-to-noise ratios, for example a signal-to-noise ratio of 3 db.

For obtaining a practicable transmission system the pilot generator 13 is an audio-frequency oscillator delivering a frequency of, say, 3.7 kc./s. exceeding the highest voice frequency, which pilot signal is supplied to the mixing stage 14 acting as a frequency-shift stage by means of the pilot filter 15 which is connected to the output and has a passband of, say, 3.5 to 3.9 kc./s. Connected to the frequency-shift stage 14 is also the output voltage of the local oscillator of 60 kc./s. connected to the single-side band modulator 4, which brings the pilot signal into a frequency position of 63.7 kc./s. flanking the single-side band voice signal of 60.3 to 63.4 kc./s., the pilot signal thus obtained being subsequently supplied through the pilot filter 16 to the input of the transmission stage 10. In the transmission stage 10, the pilot signal is transposed to the frequency $f+3.7$ kc./s. and, jointly with the single-side band voice signal, transmitted in the band of $f+0.3-f+3.4$ kc./s.

The system described has considerable practical advantages. Primarily, no special stability requirements need be imposed on the audio-frequency pilot oscillator 13 for securing a fixed frequency position between the transmitted single-side band voice signal of $f+0.3-f+3.4$ kc./s. and the transmitted pilot signal of $f+3.7$ kc./s., whilst for the frequency-shift in the frequency-shift stage use is made of the existing local oscillator 5. A minimum of equipment, which is moreover simple, permits of the requirements imposed in practice on said apparatus being completely fulfilled.

FIG. 2 shows a different form of a transmission system according to the invention, which may be advantageously used as an auxiliary apparatus in a normal single-side band transmitter. Corresponding elements are provided with the same reference numerals as in FIG. 1.

In this system, the pilot generator 17 delivers a pilot signal having a frequency which is located on the side of the side-band suppressed in the single-side band generator at a frequency distance exceeding the highest voice frequency from the carrier frequency. For example, the frequency of the pilot signal is 56.3 kc./s.

In this example the pilot generator 17 comprises a mixing stage 18 having connected to it the local oscillator 5 of 60 kc./s. connected to the single-side band modulator 4 and an audio-frequency oscillator 19 having a frequency of 3.7 kc./s. exceeding the voice frequency band, and an output filter 20 selecting the side-band frequency of 56.3 kc./s. obtained by mixing said oscillations and located on the side of the voice side band suppressed in the single-side band filter 6.

In the illustrated example, the single-side band voice channel located in the frequency band of 60.3 to 63.4 kc./s. and taken from the output of the limiter 8, and the pilot signal of 56.3 kc./s. are jointly supplied to a frequency shift stage 23 through a single-side band filter 21 and a pilot filter 22 respectively have a pass-band of approximately 56.1 to 56.5 kc./s., to which frequency-shift stage 23 also the output voltage of the local oscillator 5 connected to the single-side band modulator 4 is applied. The frequency-shift stage 23 acts at the same time as a single-side band demodulator stage, thus producing on the output circuit of the frequency-shift stage 23, jointly with the limited voice signal of 0.3 to 3.4 kc./s., a pilot signal in the adjoining frequency position of 3.7 kc./s., which signals are supplied through a low-pass filter 24 having a limiting frequency of, say 4 kc./s. as a modulation voltage to a normal single-side band transmitter 10, 11. These signals are transposed in known manner in the single-side band transmitter 10, 11 to the transmission frequency and are jointly transmitted by the transmission antenna 12. For example, the single-side band voice signal is located in the frequency band of $f+0.3$ to $f+3.4$ kc./s. and the pilot signal has a frequency of $f+3.7$ kc./s.

Also in this system, the requirements imposed in practice are fulfilled with a minimum of equipment which is moreover simple, whilst permitting existing single-side band transmitters to be adapted to said method of single-side band transmission.

It is to be noted that the transmission system according to the invention may alternatively be of different construction. Thus, for example, instead of shifting the pilot signal as shown in FIG. 1, it is fundamentally also possible to shift in frequency the single side-band voice signal.

What is claimed is:

1. A single-side band communication system comprising a source of input signals having a pre-determined bandwith, modulator means connected to said source for producing a single side band signal, limiter means connected to said modulator means to provide an amplitude limited single side-band signal, a source of pilot oscillations, means connected to apply said pilot signal oscillation to said limiter to provide a pilot signal voltage varying with the instantaneous amplitude of said input signals, the frequency of said pilot oscillations being displaced from said single side band signal a distance at least equal to said bandwidth, frequency shift means for reducing the frequency difference between said pilot signal voltage and limited single side band signal, and means connecting said frequency shift means to said limiter means.

2. A single side-band communication system comprising a transmitter having a source of input signals of predetermined bandwith, a source of local oscillations, single-side band modulator means connected to modulate said local oscillations with said input signals to provide a single side band signal, limiter means connected to limit said single side band signals to a substantially constant amplitude a source of pilot oscillations, the frequency of said pilot oscillations being displaced from the frequency of said single side-band signal a distance at least equal to said bandwidth, means connected to apply said pilot oscillations to said limiter means to provide a pilot signal voltage varying with the instantaneous amplitude of said input signals, frequency shift means for reducing the frequency difference between said pilot signal voltage and limited side-band signals, and means connecting said frequency shift means to said limiter means.

3. A single side band voice transmission system comprising a source of voice signals, a source of local oscillations, single side band modulator means connected to modulate said local oscillation with said voice signals to provide a single side-band signal, limiter means connected to said modulator means to limit said single side band signals to a substantially constant amplitude, a source of pilot oscillations, said pilot oscillations having an audio frequency exceeding the highest frequency of said voice signals, means applying said pilot oscillations to said limiter means to provide a pilot signal varying with the instantaneous amplitude of said voice signals, means modulating said local oscillations with said pilot signal and means jointly transmitting the limited single side-band signal and the pilot signal modulated local oscillations.

4. A single side-band voice transmission system comprising a source of voice signals, a source of local oscillations, single side band modulator means connected to modulate said local oscillation with said voice signals to provide a single side-band signal, limiter means connected to said modulator means to limit said single side band signals to a substantially constant amplitude, a source of pilot oscillations, said pilot oscillations having a frequency displaced from said single side band signals toward the side band suppressed in said modulator means, the frequency difference between said pilot oscillations and the frequency range of said single side band being at least equal to the highest voice frequency, means applying said pilot oscillations to said limiter means to produce a pilot signal varying with the instantaneous amplitude of said voice signals, means for reducing the frequency separation between said pilot signal and limited single side band signals comprising means for modulating said local oscillations with said pilot signal and limited side band signal to produce a pair of output signals, and means for jointly transmitting said output signals.

5. The system of claim 4, in which said source of pilot oscillations comprises a source of audio frequency oscillations having a frequency exceeding the highest voice signal frequency, and mixing stage means for mixing said audio frequency oscillations and local oscillations to produce said pilot oscillations, said mixing means having an output filter passing the mixing stage means output frequency on the same side of said local oscillations as said suppressed side-band.

References Cited in the file of this patent

UNITED STATES PATENTS

| | | |
|---|---|---|
| 2,231,538 | Kreer | Feb. 1, 1941 |
| 2,907,831 | De Jager et al. | Oct. 6, 1959 |